Jan. 4, 1966 R. KÖHLI 3,227,939
ELECTRIC MOTOR CONTROL SYSTEM
Filed Dec. 14, 1961 3 Sheets-Sheet 1
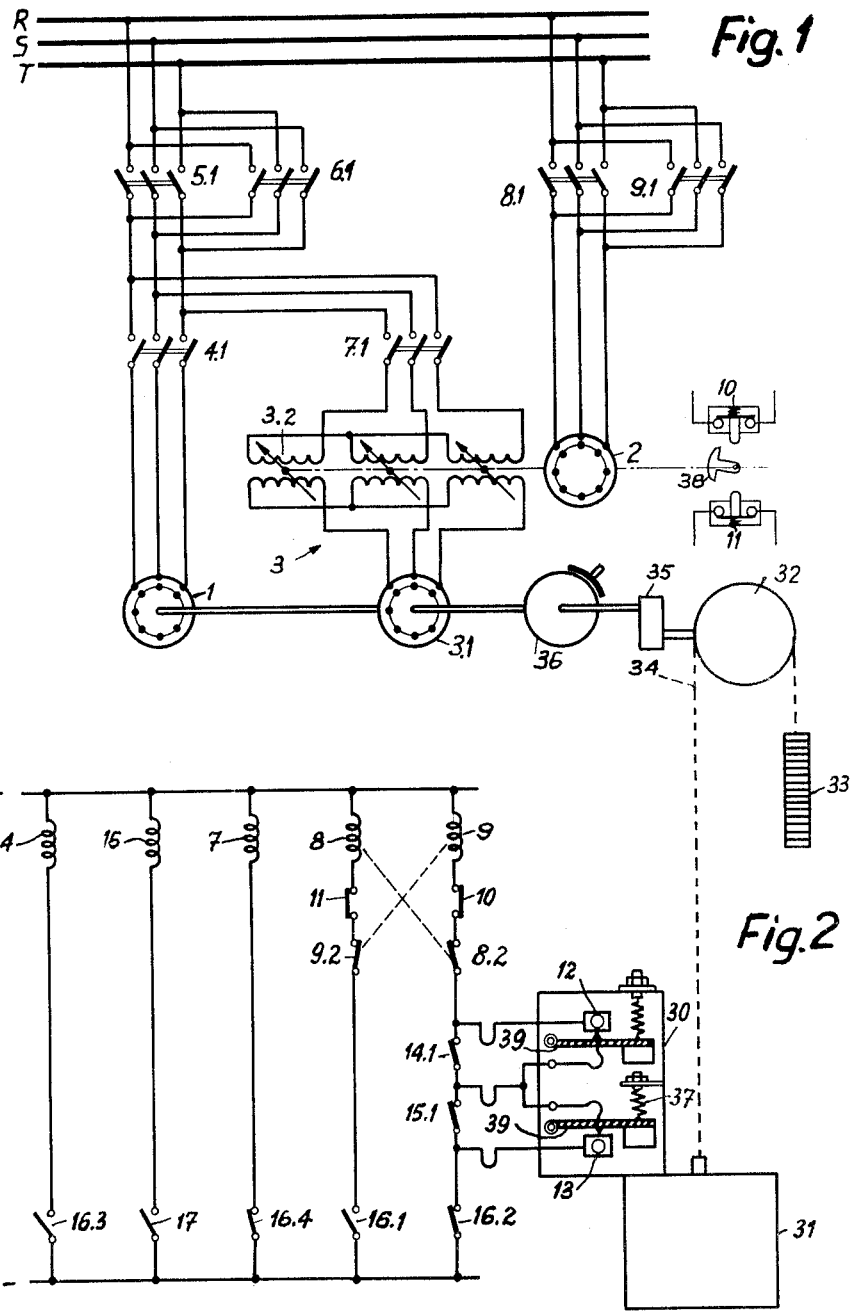
INVENTOR
ROLAND KÖHLI
BY
Abraham A. Saffitz
ATTORNEY

United States Patent Office 3,227,939
Patented Jan. 4, 1966

1

3,227,939
ELECTRIC MOTOR CONTROL SYSTEM
Roland Köhli, Bergstrasse 6, Lucerne, Switzerland
Filed Dec. 14, 1961, Ser. No. 159,397
Claims priority, application Switzerland, Dec. 16, 1960,
14,096/60
2 Claims. (Cl. 318—369)

The present invention relates to an electric motor control system for operating the brakes of elevators, particularly of elevators driven by three-phase motors.

The electric motor control system of the present invention comprises braking elements operatively controlled by a servo-motor which is coupled with acceleration and deceleration sensing means for continuously checking acceleration and deceleration or retardation of the elevator cabin whereby the servo-motor actuates the braking element as soon as acceleration as well as deceleration go beyond predetermined limits.

Effectively, the acceleration and deceleration means constantly monitor the condition of movement of the elevator cabin and the direction of travel of the cabin; and these means actuate, through the control of the angle of rotation of the servo-motor, a brake drum mechanism to exert a braking action on the three-phase motor constituting the electrical motor drive. The specific features of the sensing means and interrelation between the special type of servo-motor and braking mechanism provide a new and highly useful device contributing to the safety and better operation of modern elevators.

Heretofore, a problem has been encountered in respect to the control of braking distance and efforts have been directed to making adjustments as small as possible. Generally, the braking requirement is directly proportional to the elevator load being carried; and further, there is a requirement that deceleration which occurs as a result of braking should not exceed certain limits for the comfort and safety of passengers or cargo.

The electrical motor drive generally employed is a three-phase motor system adapted with braking means to reduce the halting distance and to permit for fine adjustments, either through the use of a first type of brake having a constant braking moment with an arrangement which varies the braking time in relation to the load, or through the use of a second type of brake which provides constant deceleration independent of the load. The disadvantage of the first type of brake is that the braking time becomes significantly longer as the load decreases from the maximum load permissible; and the disadvantage of the second type of brake is that it results in sudden and often extreme jarring.

In the preferred embodiment of the present invention a three phase electric motor control system automatically monitors and controls the acceleration and retardation of the elevator cabin based upon the braking of the three phase driving motor at the output shaft thereof through electrically actuated brake drum means which surrounds and is urged against the output shaft of the three phase driving motor. This direct connection of the brake drum means to the output shaft permits electrical and mechanical adjustments to overcome the disadvantages of prior braking systems, thereby contributing to the comfort and safety of the passengers.

The specific arrangement employed in the present invention which allows for very fine adjustments in braking distance and braking moment and continuously controlled movement in ascending and descending directions consists of a three phase servo-motor and of special automatic control features. These automatic control features of acceleration sensing means are mounted on the elevator cabin and include a direct source of current voltage,

2 relays and switches connected in parallel to indicate the direction of acceleration and retardation, as well as coil induction means to indicate the degree of acceleration and retardation. The specific acceleration and retardation monitoring means include two normally closed direction contactors, one which opens when the elevator cabin descends, and the other which opens when the elevator cabin ascends, these contactors being urged into closed position when the retardation of the elevator cabin has dropped to a small predetermined value. This is accomplished by bridging contacts which connect the aforesaid acceleration and retardation monitoring means with the two direction contactors, whereby induction of voltage in the induction coils during movement of the elevator cabin causes the servo-motor to rotate to apply a braking moment of the braking means against the output shaft, this braking moment being opposite to the direction of the elevator cabin movement which is being sensed by the direction contactors. Thus, the induction coils govern the braking action within the limits of the synchronous connection of the servo-motor to the three phase driving motor for the elevator cabin.

Accordingly, it will be seen that for the initiation of braking, the switching of the servo-motor to its on position provides an increase of braking moment in the same direction of movement as the braking element until the specific or pre-set retardation is reached and the servo-motor is then cut off, there being employed an acceleration sensing means to sense the pre-set retardation and to also cut off the servo-motor.

The preferred embodiments of the invention are illustrated in the accompanying drawings in which:

FIG. 1 shows the circuit illustrating electrical braking;

FIG. 2 shows the circuit of a first governor arrangement;

Figure 3:
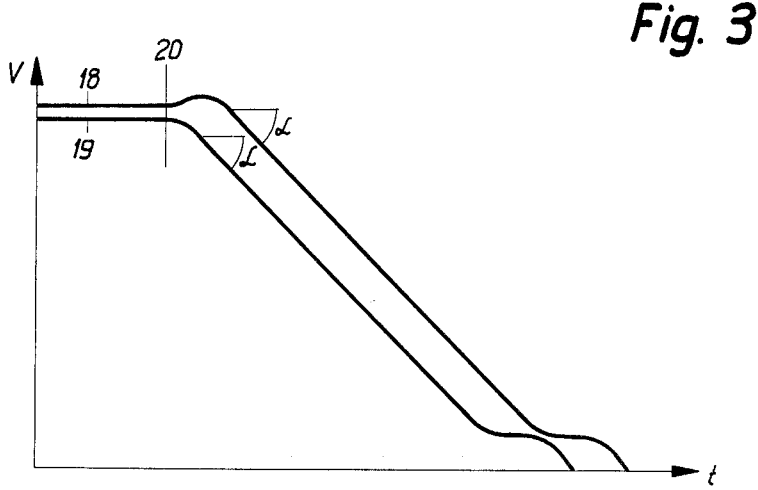
FIG. 3 shows the velocity-time curve for the embodiment of FIGS. 1 and 2.

In FIG. 1 a low-pole three-phase current driving motor is used to drive the elevator and servo-motor 2 is provided to actuate the electrically driven braking element 3. The electrically driven braking element 3 consists of a high-pole three-phase current motor, designated 3.1, the shaft of which is coupled with the shaft of the driving motor 1 and an induction coil governor 3.2, the rotatable part of which is shifted by the servo-motor 2. The three-phase current mains for the motors 1, 2, 3.1 are designated by the lines R, S and T. The driving motor 1 is connected through the main contacts 4.1 of the three-pole circuit closing contactor 4 and the main contacts 5.1 or 6.1 of the three-pole direction contactor pair with the three-phase current mains R, S and T. The induction governor 3.2 is also connected with the high-pole three-phase current motor 3.1 and also through the main contacts 7.1 of a three-pole contactor 7 and the main contacts 5.1 and 6.1 to the three-phase current mains. The main connection of servo-motor 2 takes place through the main contacts 8.1 and 9.1 of a three-pole direction contactor pair 8.9.

In the parallel circuit arrangement of FIG. 2, + and − designate the terminals of a direct current voltage source to supply the energizing coils as coils for the direction contactors 8, 9, 4, and 7. The direction contactors 8 and 9 are mutually locked through the two off contacts 8.2 and 9.2, while 10 and 11 designate the two end contacts of the induction coils governor 3.2. Contacts 10 and 11 are actuated by lever 38 which is rotatably coupled with the servo-motor 2. The two contacts 12 and 13 of the acceleration-sensing apparatus 30 serve for connection to the corresponding isolated lever 39, each of which is pivotally arranged in the housing of the acceleration-sensing apparatus 30 and is secured on the lift cabin 31. There are also provided two spring means, each numbered 37 for each lever. The elevator cabin 31 is provided with a counterbalance made of a rope 34, guided by a pulley 32, and secured to counterweight 33. The pulley 32 is actuated by gear 35, driven by the three-phase current motor 3.1, and braked by an interconnected disc brake 36. When the elevator cabin 31 reaches a specific retardation, the contact 12 opens in the case of descent while the contact 13 opens in the case of ascent. These contacts 12 and 13 are only closed again when the retardation has dropped to a smaller predetermined value. Each of these contacts is bridged by the corresponding off contact 14.1, 15.1 of the travel direction relays of the elevator control system. In this direct current circuit there is also provided control relay 16 actuated by contact 17 of the elevator control system. Control relay 16 is provided with the off switches 16.1, 16.3 and the on switches 16.2 and 16.4.

The operation is as follows: The elevator cabin is, in this case, traveling downward at full speed. Under this condition, the contact 17 is closed and the direction relay 5 is pulled up. The contact 5.1 is closed and the contact 14 is opened. Further, the control relay 16 is closed and the circuit closing contactor 4 is pulled up. The rotor of servo-motor 2 is in its initial position, so that the end contact 11 is opened and the induction governor 3.2, disconnected from the three-phase current mains by the opened contact 7.1, is situated in the position of the minimum secondary voltage.

At a pre-set distance from the destination, the contact 17 is opened in order to initiate electrical braking. The control relay 16 falls open. The contactors 7 and 9 pull up and the contactor 4 falls open so that contacts 7.1 and 9.1 are closed and the contact 4.1 is opened. The high-pole three-phase current motor 3.1 receives, at the first moment of the braking operation, the minimum voltage of the induction coil governor 3.2, which is so low that the commencement of the braking moment cannot be felt in the cabin. At the same time, the servo-motor 2 commences to rotate so that the voltage of the induction governor and, thus, the braking moment exerted by the high-pole three-phase current motor, increase constantly.

When the elevator cabin 31 reaches a specific retardation, the contact 12 opens in the case of descent while the contact 13 opens in the case of ascent. These contacts 12 and 13 are closed again only when the retardation has dropped to a smaller, predetermined valve. Each of these contacts is bridged by the corresponding off contacts 14.1 and 15.1 of the travel direction relays of the elevator control system. In the circuit, there is also provided a control relay 16 actuated by contact 17. Control relay 16 is provided with off switches 16.1 and 16.3 and on switches 16.2 and 16.4. After a certain time, the high-pole three-phase current motor has braked the elevator to its synchronous rotation speed, which corresponds to the adjusting speed of the elevator, and the retardation due to braking disappears. The acceleration-sensing apparatus 30 then closes its contact 12 again so that the contactor 9 again drives the servo-motor in the same direction as previously. The induction governor 3.2 passes into its end position determined by the end contact 10. The voltage on the high-pole three-phase current motor 3.1 then rises to a voltage above the normal voltage of the motor, which reduces any slip in adjustment and insures the exact stopping of the elevator.

In FIG. 3 the curve 18 shows the velocity as a function of time of electrical braking in the case of descent with a full load. Curve 19 shows velocity and time in the case of ascent with a full load and point 20 designates the point of initiation of braking. The angle alpha indicates the critical retardation at which the acceleration-sensing apparatus switches.

Figure 6:
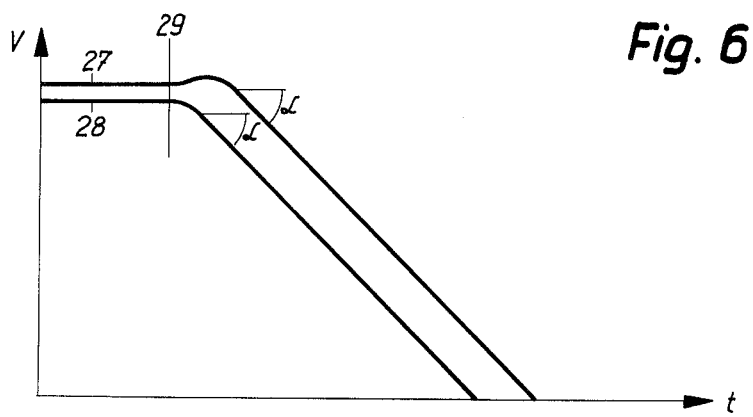
FIG. 6 shows the velocity-time curve for the embodiment of FIGS. 4 and 5.
Figure 4:
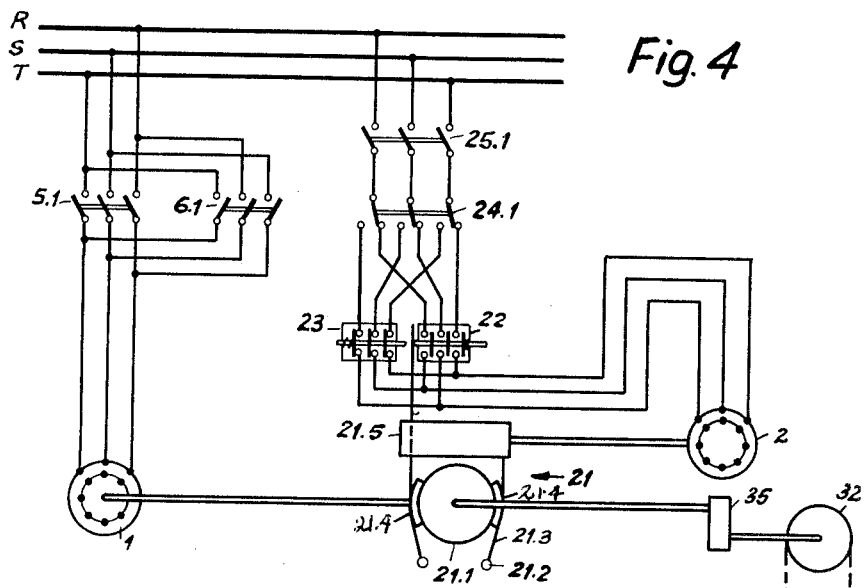
FIG. 4 shows a modification of the invention combining electrical braking and mechanical braking.

In the embodiment according to FIGS. 4 and 6, the electrical braking arrangement cooperates with a mechanical brake. In the circuit of FIG. 4, the three-phase current driving motor of the lift is designated by 1, the servo-motor by 2, and the driving motor 1 is connected with the three-pole contact 5.1 of the direction contactor 5 or the three-pole contact 6.1 of the direction contactor 6 to the three-phase current mains R, S and T, depending on the desired direction of rotation. The brake, designated by 21, comprises brake drum 21.1 surrounding the output shaft of the lifting motor and two brake levers 21.3 mounted at pivot points 21.2, by means of which the two brake shoes 21.4 are pressed against the brake drum 21.1, and also includes an operating apparatus 21.5 which is driven by servo-motor 2. This operating apparatus is described in copending application Serial No. 53,122.

The operating apparatus 21.5 is so constructed that on dextro-rotation of the servo-motor 2 the brake 21 is released, and on levo-rotation the brake shoes 21.4 are pressed by the brake levers 21.3 with a brake pressure, increasing constantly from zero against the brake disc 21.1. The two end positions of the brake levers 21.3 are given by two three-pole end contacts 22 and 23 in the supply lead of the servo-motor 2. In the supply lead of the servo-motor 2 there further lies a three-pole switch-over contact 24.1 of a switch-over contactor 24 and a three-pole contact 25.1 of a circuit-closing contactor 25.

Figure 5:
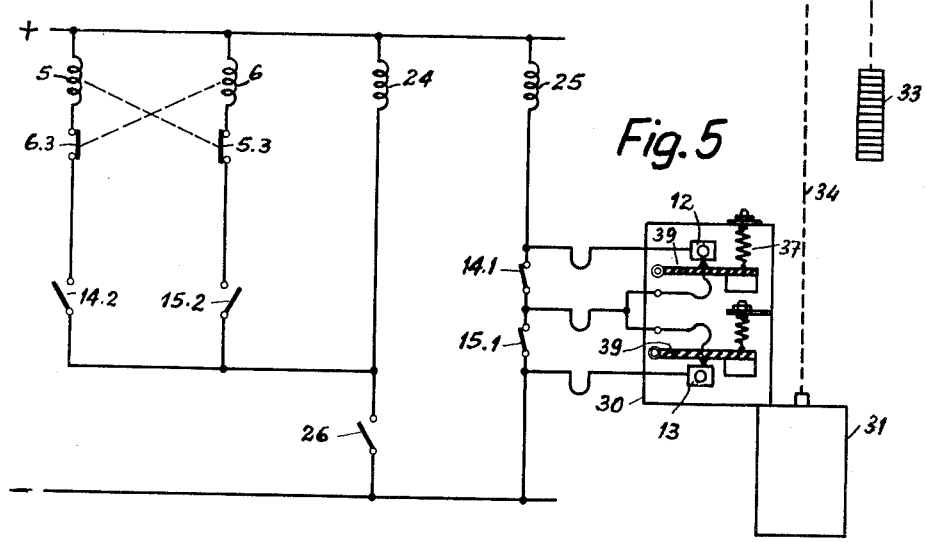
FIG. 5 shows a governor arrangement adapted for the modification of FIG. 4.

In FIG. 5 + and − designate the terminals of a direct current voltage supply for the energizing coils of the direction contactors 5, 6, 24 and 25. The direction contactors 5 and 6 are mutually locked through the two off contacts 6.3 and 5.3 and are actuated by the two contacts 14.2 and 15.2 of the travel direction relays of the lift control arrangement, while 26 is the contact for initiating braking. In the circuit with circuit-closing contactor 25 there are connections to the two contacts 12 and 13 of the acceleration-sensing apparatus 30 as described in the first example and these are bridged over by the two off contacts 14.1 and 15.1 of the travel direction relay.

The braking arrangement with mechanical braking, according to FIGS. 4 to 6, works as follows: The elevator is in full ascent, the contacts 26 and 5.1, 15.2 are closed, and the contactors 6, 24 and 25 are pulled up while the brake 21 is disengaged, so that the end contact 23 is opened.

At a specified distance before the destination the contact 26 is opened for the initiation of the mechanical braking. The direction contactor 6 drops off and the switch-over contactor 24 switches on the servo-motor 2 in the direction of rotation for closing the brake 21. The brake 21, actuated by the means at 21.5, exerts a braking moment against the output shaft which rises constantly from zero so that the travel of the lift is retarded. When the retardation has reached a specific value, the contact 13 opens, so that contactor 24 drops open, disconnects the servo-motor 2 from the three-phase current mains R, S and T and the servo-motor stops. The braking moment thus achieved by the brake 21 persists until the end of the trip. As soon as the elevator stops, the contact 13 closes again and the contactor 24 switches on the servo-motor 2 again, and the brake 21 passes into its closed end position.

FIG. 6 shows by curve 27 the speed in descent as a function of time with full load in the case of mechanical braking, and curve 28 shows ascent with full load while point 29 designates the point of initiation of braking. The angle alpha indicates the critical retardation at which the acceleration-sensing apparatus switches.

The embodiment in FIGS. 4 to 6 can be modified to achieve finer adjustment of the stopping of the elevator so that when a low rotational speed is reached the brake is released. This is accomplished by providing a centrifugal switch and an additional high-pole drive motor is switched on which brings the elevator cabin at controlled speed to the exact floor level, where it is switched off by a shaft switch and the brake is closed.

Having thus disclosed the invention, what is claimed is:

1. In a three-phase electric motor control system for automatically monitoring and controlling both acceleration and retardation of an elevator cabin, said three-phase motor control system including a three-phase driving motor, electrically actuated brake drum means mechanically connected to surround and be urged against the output shaft of the three-phase driving motor and a three-phase servo-motor for electrically actuating said brake drum means, that improvement in automatic control consisting of acceleration-sensing means mounted on the elevator cabin, said acceleration-sensing means including a direct current voltage source, coil induction means to indicate the degree of acceleration and retardation, and acceleration and retardation monitoring means for the elevator cabin comprising a first normally closed down-direction contactor opening on descent of the elevator, a second normally closed up direction contactor opening on ascent of the elevator, and means urging the closing of the aforesaid contacts when the retardation has dropped to a small predetermined value as a result of braking, said contact closing means including bridging contacts which are connected to said acceleration and retardation monitoring means whereby induction of voltage in said induction coils during movement of said elevator cabin initiates rotation of said servo-motor to apply a braking moment of the braking means against the output shaft opposite to the direction of movement of said elevator cabin as sensed by the direction contacts, said induction coil means energizing said servo-motor and thereby governing the braking action by synchronous connection of the servo-motor.

2. A system in accordance with claim 1 wherein said brake drum means includes brake shoes mounted on brake levers and a counterweight to press said levers and shoes against said brake output shaft at a pressure which depends upon the rotation of the servo-motor to actuate said brake drum means, said pressure being greater than the predetermined counterweight which must be overcome to actuate said brake means by said servo-motor.

References Cited by the Examiner
UNITED STATES PATENTS 2,140,640  12/1938  McCune _____ 318—369 X
2,994,025  7/1961  Mitchell _____ 318—369 X

FOREIGN PATENTS 491,749  9/1938  Great Britain.

ORIS L. RADER, *Primary Examiner.*

MILTON O. HIRSHFIELD, *Examiner.*